United States Patent
Kim

(10) Patent No.: US 6,275,264 B1
(45) Date of Patent: Aug. 14, 2001

(54) METHOD AND APPARATUS FOR DETECTING A SYNCHRONOUS SIGNAL

(75) Inventor: Chul-Min Kim, Anyang (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/004,321

(22) Filed: Jan. 9, 1998

(30) Foreign Application Priority Data

Jan. 17, 1997 (KR) ............................................... 1997-1323

(51) Int. Cl.[7] ........................................................ H04N 5/08
(52) U.S. Cl. ........................ 348/525; 348/194; 348/500; 382/191
(58) Field of Search ..................... 348/194, 500, 348/511, 525, 529–531, 536, 542, 543, 546–548, 476–479; 382/19

(56) References Cited

U.S. PATENT DOCUMENTS

| | | | |
|---|---|---|---|
| 4,343,019 | * 8/1982 | Lagoni | 348/665 |
| 5,031,041 | * 7/1991 | Fling | 348/529 |
| 5,402,488 | * 3/1995 | Karlock | 380/204 |
| 5,504,533 | * 4/1996 | Ito et al. | 348/511 |

FOREIGN PATENT DOCUMENTS

| | | | |
|---|---|---|---|
| 3-198487 | 8/1991 | (JP) | H04N/5/93 |
| 4-114575 | 4/1992 | (JP) | H04N/5/44 |
| 4-192978 | 7/1992 | (JP) | H04N/5/44 |
| 7-23304 | 1/1995 | (JP) | H04N/5/44 |
| 8-9333 | 1/1996 | (JP) | H04N/5/93 |

* cited by examiner

*Primary Examiner*—Leo Boudreau
*Assistant Examiner*—Gregory Desire
(74) *Attorney, Agent, or Firm*—Sughrue, Mion, Zinn, Macpeak & Seas, PLLC

(57) ABSTRACT

A method for detecting a synchronous signal contained in an input image signal is provided. In the method, horizontal and vertical periods are established during which horizontal and vertical synchronous signal pulses contained in the input image signal are counted, respectively. Then, minimum and maximum horizontal values which correspond to the horizontal synchronous signal pulses contained in the horizontal period are established, and minimum and maximum vertical values which correspond the vertical synchronous signal pulses contained in the vertical period are established. Afterwards, the horizontal and vertical synchronous signal pulses are counted during the horizontal and vertical periods to respectively obtain first and second counted values. Then, the method determines if the first counted value is greater than or equal to the minimum horizontal value and less than or equal to the maximum horizontal value and determines if the second counted value is greater than or equal to the minimum vertical value and less than or equal to the maximum vertical value. Subsequently, the method determines than an actual synchronous signal is contained in the input image signal if the first counted value is greater than or equal to the minimum horizontal value and less than or equal to the maximum horizontal value and the second counted value is greater than or equal to the minimum vertical value and less than or equal to the maximum vertical value.

1 Claim, 7 Drawing Sheets

FIG. 5
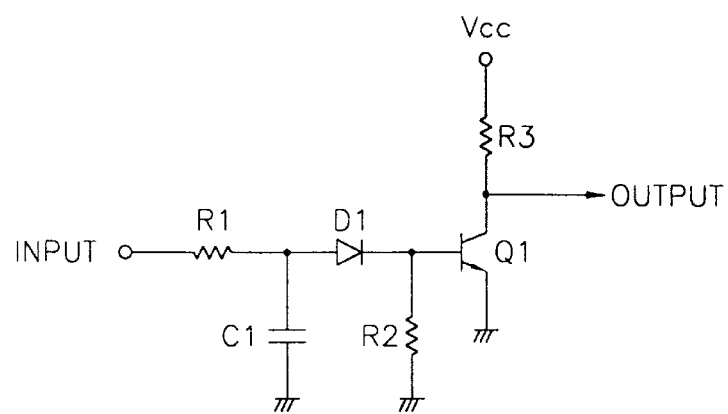
FIG. 6A   COMPOSITE SYNCHRONOUS SIGNAL 
FIG. 6B   V-sync 

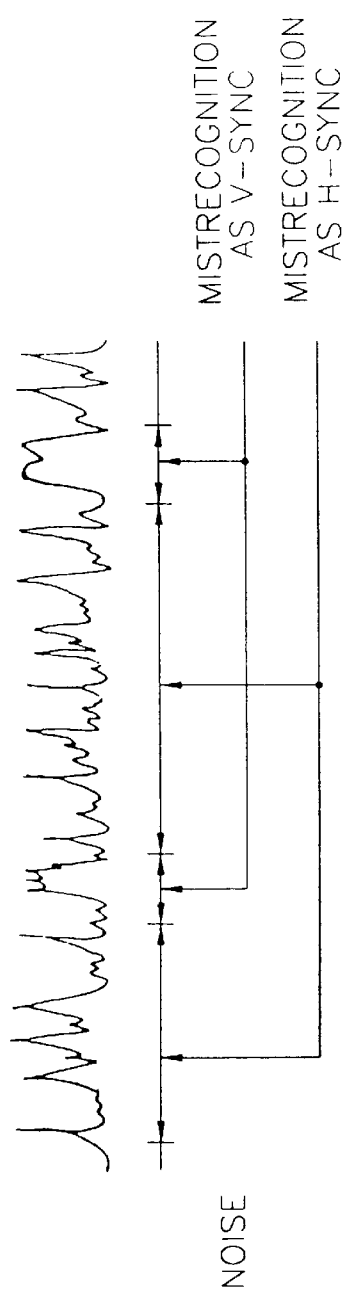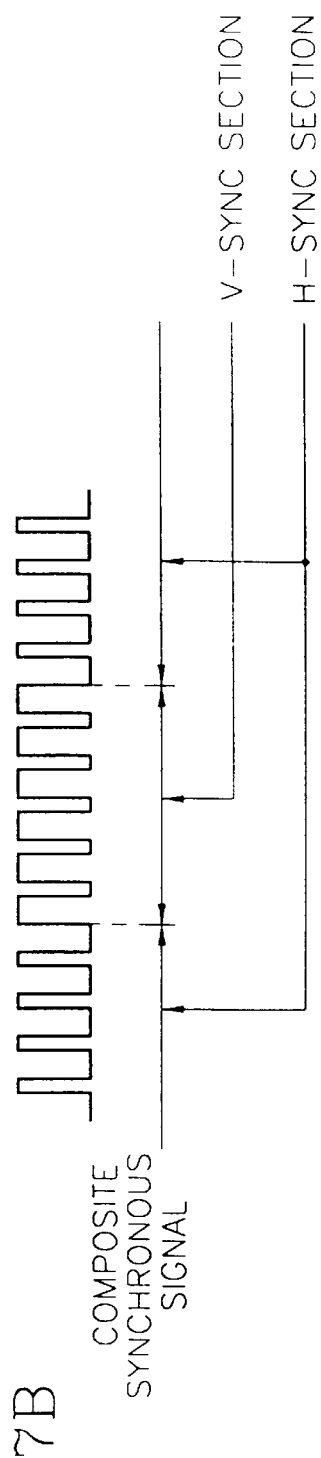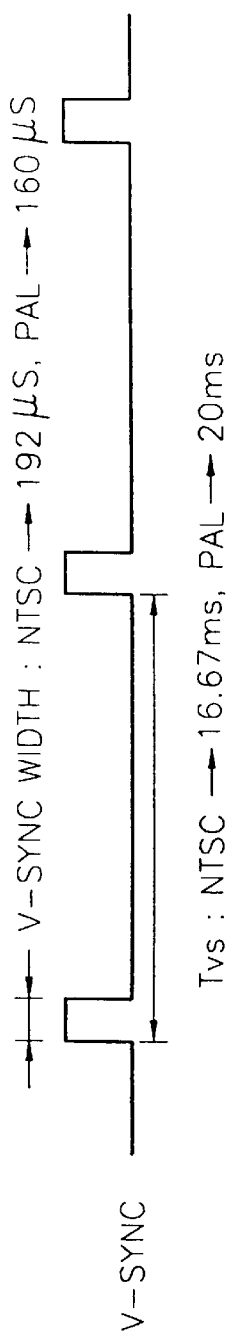

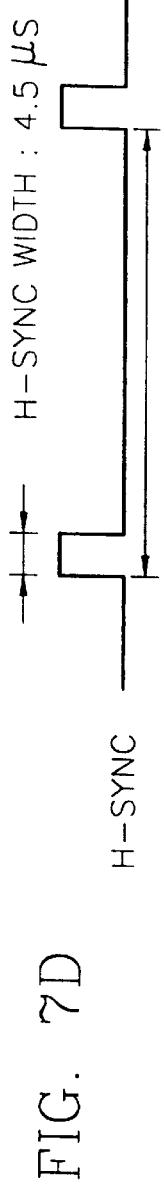
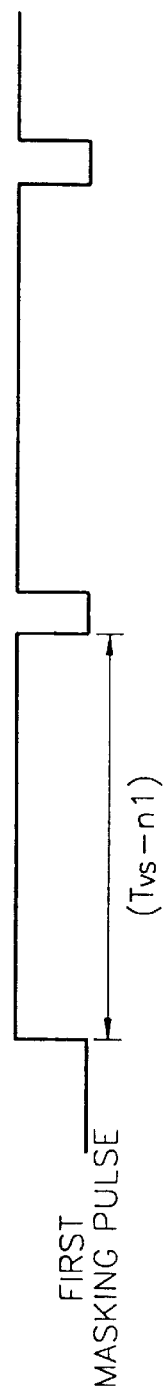
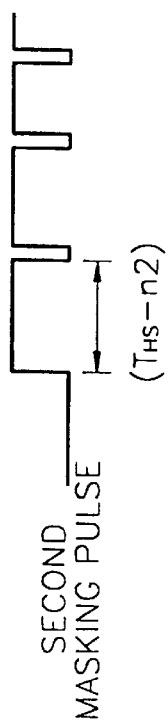
FIG. 7D  H-SYNC
FIG. 7E  FIRST MASKING PULSE
FIG. 7F  SECOND MASKING PULSE
FIG. 7G  NOISE GATE PULSE

METHOD AND APPARATUS FOR DETECTING A SYNCHRONOUS SIGNAL

FIELD OF THE INVENTION

The present invention relates to an image signal processing method and a corresponding apparatus. More particularly, the present invention relates to a synchronous signal determining method and apparatus which can accurately detect a normal image signal despite interference caused by noise.

BACKGROUND OF THE INVENTION

In general, a television display of an NTSC broadcasting system forms an image frame with two field signals, and one frame is generated from 525 line signals which are contained in an image signal. The image signal also comprises a vertical synchronous signal V-SYNC for synchronizing the two field signals with each other and contains a horizontal synchronous signal H-SYNC for synchronizing the 525 line signals with each other.

In an image signal recording/reproducing apparatus, the synchronous signals V-SYNC and H-SYNC are detected and utilized for various signal processing operations. For example, if a synchronous signal is not detected from an image signal that is input when a television is switched from a broadcasting channel to another broadcasting channel, the apparatus determines that no image signal exists. In such instance, a noise picture, which is normally displayed when a synchronous signal is not detected, is replaced by a blue background picture or another reference picture. Thus, tuning to a channel which is not carrying an image signal is more aesthetically pleasing to a viewer.

In a conventional method for detecting an image signal, the input of an image signal is detected by counting the number of synchronous signals generated during one field or one frame of the image signal or by determining the cycle of the synchronous signal. However, various noises exist in an image signal recording/reproducing apparatus. Thus, when the frequency (or pulse width) of the noises are similar to the frequency (or pulse width) of the synchronous signals, the noises can be misjudged as synchronous signals. (See FIG. 7A). As a result, the method incorrectly detects the presence of an image signal. Similarly, if noise significantly interferes with a valid synchronous signal, the method may incorrectly detect the absence of an image signal.

SUMMARY OF THE INVENTION

In order to overcome the above problems, an object of the present invention is to provide a method and apparatus which correctly detect the input of a synchronous signal without error in spite of noise which is similar to the synchronous signal.

In order to accomplish the above and other objects, a method for determining if a synchronous signal is contained in an input image signal is provided. The method comprises the steps of: (a) establishing a horizontal period during which horizontal synchronous signal pulses contained in said input image signal are counted; (b) establishing a vertical period during which vertical synchronous signal pulses contained in said input image signal are counted; (c) establishing a minimum horizontal value and a maximum horizontal value which correspond to a proper number of said horizontal synchronous signal pulses contained in said horizontal period; (d) establishing a minimum vertical value and a maximum vertical value which correspond to a proper number of said vertical synchronous signal pulses contained in said vertical period; (e) counting a first number of said horizontal synchronous signal pulses during said horizontal period to obtain a first counted value; (f) counting a second number of said vertical synchronous signal pulses during said vertical period to obtain a second counted value; and (g) determining if said first counted value is greater than or equal to said minimum horizontal value and less than or equal to said maximum horizontal value; (h) determining if said second counted value is greater than or equal to said minimum vertical value and less than or equal to said maximum vertical value; and (i) determining than an actual synchronous signal is contained in said input image signal if said first counted value is greater than or equal to said minimum horizontal value and less than or equal to said maximum horizontal value and said second counted value is greater than or equal to said minimum vertical value and less than or equal to said maximum vertical value.

In order to further accomplish the above and other objects, a method for determining if a synchronous signal is contained in an input image signal is provided. The method comprises the steps of: (a) establishing a vertical period during which vertical synchronous signal pulses contained in said input image signal are counted; (b) establishing a minimum vertical value and a maximum vertical value which correspond to a proper number of said vertical synchronous signal pulses contained in said vertical period; (c) establishing a minimum noise count value and a maximum noise count value which correspond to a number of noise pulses that are estimated to be similar to said vertical synchronous signal pulses in a noise gate pulse period; (d) generating a noise gate pulse between adjacent pulses of said vertical synchronous signal pulses; (e) counting a first number of said vertical synchronous signal pulses during said vertical period to obtain a first counted value; (f) determining if said first counted value is greater than or equal to said minimum vertical value and less than or equal to said maximum vertical value; and (g) generating a negative determination signal as a current determination signal when said first counted value is less than or equal to said minimum vertical value or is greater than or equal to said maximum vertical value, wherein said negative determination signal indicates that an actual synchronous signal is not contained in said input image signal; (h) counting a second number of said noise pulses during said noise gate pulse period to obtain a second counted value; and (i) generating a positive determination signal as said current determination signal when said first counted value is greater than or equal to said minimum vertical value and less than or equal to said maximum vertical value and when said second counted value is less than said minimum noise count value, wherein said positive determination signal indicates that an actual synchronous signal is contained in said input image signal.

In order to additionally accomplish the above and other objects, an apparatus for determining if a synchronous signal is contained in an input image signal is provided. The apparatus comprises: a vertical synchronous signal separator which separates vertical synchronous signal pulses from composite synchronous signals; a first counter which is operably connected to said vertical synchronous signal separator and which counts a first number of said vertical synchronous signal pulses that exist during a first predetermined period to obtain a first counted value; a first comparator which is operably connected to said first counter and which generates a first detection signal when said first counted value is greater than or equal to a predetermined minimum vertical value and is less than or equal to a predetermined maximum vertical value; a second counter which inputs horizontal synchronous signal pulses contained in said composite synchronous signals and which counts a second number of said horizontal synchronous pulses during a second predetermined period to generate a second counted value; a second comparator which is operably connected to said second counter and which generates a second detection signal when said second counted value is greater than or equal to a predetermined minimum horizontal value and is less than or equal to a predetermined maximum horizontal value; and an operator circuit which inputs said first detection signal and said second detection signal and generates a determining signal based on said first detection signal and said second detection signal.

In order to even further accomplish the above and other objects, an apparatus for determining if a synchronous signal is contained in an input image signal is provided. The apparatus comprises: a vertical synchronous signal separator which separates vertical synchronous signal pulses from composite synchronous signals contained in said input image signal; a first counter which is operably connected to said vertical synchronous signal separator and which counts a first number of said vertical synchronous signal pulses that exist during a first predetermined period to obtain a first counted value; a noise gate pulse generator which inputs said vertical synchronous signal pulses and generates a noise gate pulse between adjacent vertical synchronous signal pulses; a logic switch portion which is operably connected to said noise gate pulse generator and which inputs said composite synchronous signals and said noise gate pulses, processes said composite synchronous signals and said noise gate pulses, and outputs noise pulses; a second counter which is operably connected to said logic switch portion and which counts a second number of said noise pulses to obtain a second counted value; and a comparator which is operably connected to said first counter and said second counter and which generates a current determining signal having a first value indicating that an actual synchronous signal is contained in said input image signal when said first counted value and second counted values have particular values.

BRIEF DESCRIPTION OF THE DRAWINGS

The above objects and advantages of the present invention will become more apparent by describing in detail a preferred embodiment thereof with reference to the attached drawings in which:

FIG. 5 is an example of a detailed circuit diagram of a vertical synchronous signal separator shown in FIGS. 1 and 2;

FIG. 6A is an example of a waveform of a composite synchronous signal input to the circuit shown in FIG. 5;

FIG. 6B is an example of a waveform of a vertical synchronous signal output from the circuit shown in FIG. 5;

FIG. 7A is an example of a waveform of noise which may be misinterpreted as vertical and horizontal synchronous signals;

FIG. 7B is an example of a waveform of a composite synchronous signal;

FIG. 7C is an example of a waveform of a vertical synchronous signal;

FIG. 7D is an example of a waveform of a horizontal synchronous signal;

FIG. 7E is an example of a waveform of a first masking pulse output from the first noise masking portion shown in FIG. 1;

FIG. 7F is an example of a waveform of a second masking pulse output from the second noise masking portion shown in FIG. 1; and FIG. 7G is an example of a waveform of a noise gate pulse output from the noise gate pulse generator shown in FIG. 2.

DETAILED DESCRIPTION OF THE PREFERRED EMBODIMENTS

The following description of the preferred embodiments discloses specific circuit configurations, components, values, etc. However, the preferred embodiments are merely examples of the present invention, and thus, the specific components and values described below are only used to more easily describe such embodiments and to provide an overall understanding of the present invention. Accordingly, one skilled in the art will readily recognize that the present invention is not limited to the specific components and values described below. Furthermore, the descriptions of various features and structures of the present invention which would have been known to one skilled in the art are omitted for the sake of clarity and brevity.

Figure 3:
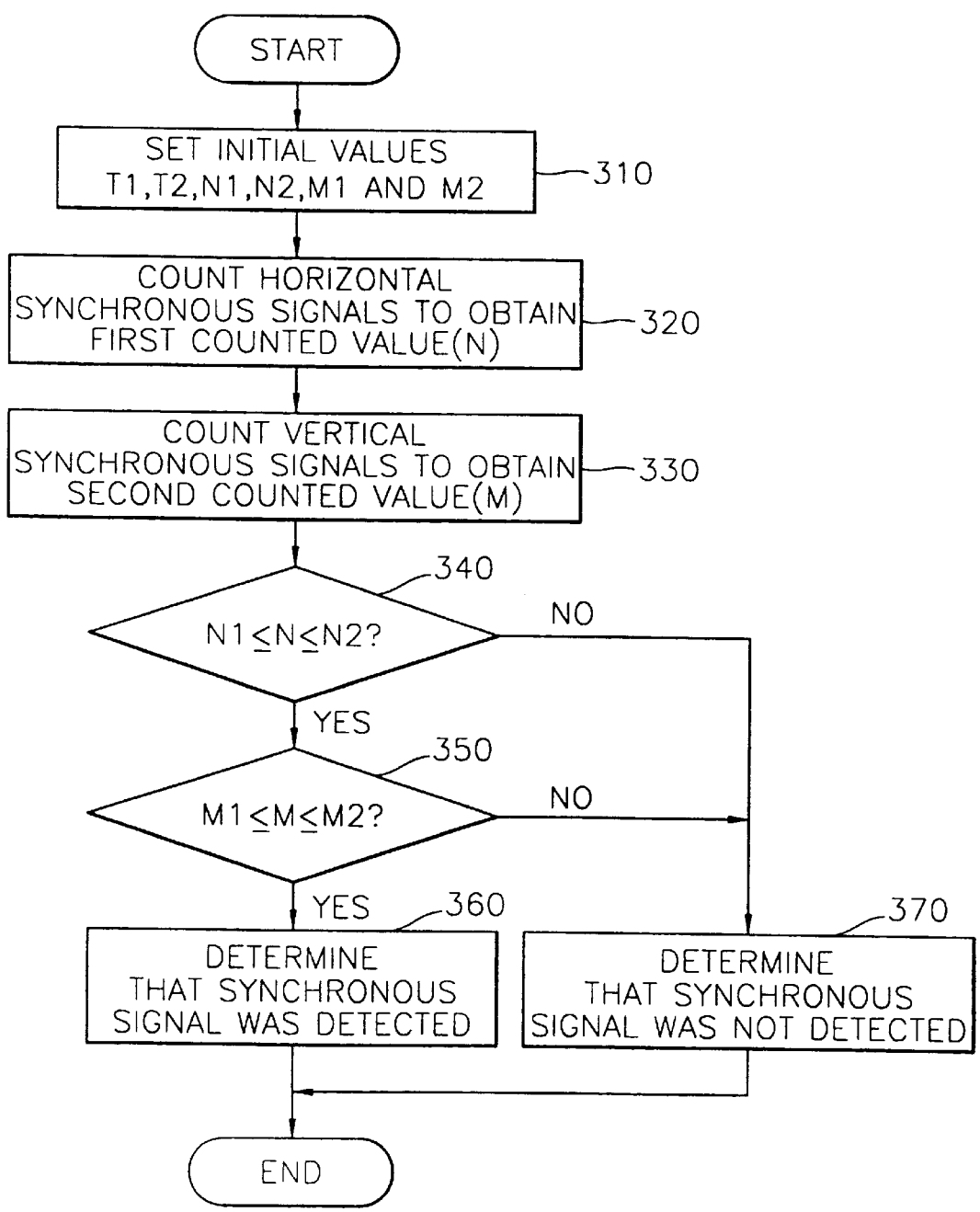
FIG. 3 is a flow chart of a synchronous signal determining method according to an embodiment of the present invention.

FIG. 3 illustrates an example of a method for detecting a synchronous signal according to an embodiment of the present invention. In the method, initial values are set for first and second periods T1 and T2, minimum and maximum horizontal values N1 and N2, and minimum and maximum vertical values M1 and M2 (step 310).

In an NTSC broadcasting system, the first period T1 coincides with a time during which pulses of a horizontal synchronous signal H-SYNC is input. Also, the period T1 should preferably be set to a time which is larger than a minimum cycle of a horizontal synchronous signal H-SYNC so that the number of synchronous signals H-SYNC can be adequately counted. As shown in FIG. 7D, the period $T_{HS}$ of the horizontal synchronous signal H-SYNC is 64 $\mu$sec, and thus, the first period T1 should be greater than such period $T_{HS}$. Similarly, the second period T2 coincides with a time during which pulses of a vertical synchronous signal V-SYNC is input. Also, the period T2 should preferably be set to a time which is larger than a minimum cycle of a vertical synchronous signal V-SYNC so that the number of synchronous signals V-SYNC can be adequately counted. As shown in FIG. 7C, the period $T_{VS}$ of the vertical synchronous signal V-SYNC is 16.67 msec (in an NTSC broadcasting system), and thus, the second period T2 should be greater than such period $T_{VS}$. The values N1 and N2 respectively relate to the minimum and maximum number of pulses of the horizontal synchronous signals H-SYNC which should occur during the first period T1. Such values N1 and N2 should be set by considering the fact that some of the horizontal synchronous signals H-SYNC may be overlooked due to noise or that noise may be misidentified as synchronous signals H-SYNC. Likewise, the values M1 and M2 respectively relate to the minimum and maximum number of pulses of the vertical synchronous signals V-SYNC which should occur during the second period T2. Also, the values M1 and M2 should based on the fact that a portion of the vertical synchronous signals V-SYNC may be overlooked due to noise or that noise may be misidentified as synchronous signals V-SYNC.

Then, the pulses which are input during the first period T1 and which have a particular frequency (or pulse width) value are detected as horizontal synchronous signals H-SYNC, and the number of detected horizontal synchronous signals H-SYNC are counted to produce a first counted value N (step 320). Not only are actual horizontal synchronous signals H-SYNC counted during the period T1, but any noise which is misidentified as a horizontal synchronous signal H-SYNC is also counted. Also, a pulse of an actual horizontal synchronous signal H-SYNC which is affected by noise may not be counted.

Afterwards, the pulses which are input during the second period T2 and which have a particular frequency (or pulse width) value are detected as vertical synchronous signals V-SYNC, and the number of detected vertical synchronous signals V-SYNC are counted to produce a second counted value M (step 330). As in the case of the detected horizontal synchronous signals H-SYNC, not only are actual vertical synchronous signals V-SYNC counted during the period T2, but any noise which is misidentified as a vertical synchronous signal V-SYNC is also counted. Also, a pulse of an actual vertical synchronous signal V-SYNC which is affected by noise may not be counted.

After the counted values M and N have been calculated, the method determines if the first counted value N is between the minimum and maximum horizontal values N1 and N2 (step 340). If the first counted value N is not within such range, the method determines that an actual horizontal synchronous signal H-SYNC has not been detected within the time period T1. Thus, the method determines that a synchronous signal is not being input, and a non-detection signal is generated (step 370).

On the other hand, if the first counted value N is between the minimum and maximum horizontal values N1 and N2, the method determines that an actual horizontal synchronous signal H-SYNC has been detected. Then, the method determines if the second counted value M is between the minimum and maximum vertical values M1 and M2 (step 350). If the second counted value M is smaller than the minimum vertical value M1 or larger than the maximum vertical value M2, the method determines that an actual vertical synchronous signal V-SYNC has not been detected within the time period T2. Thus, the method determines that a synchronous signal is not being input, and the non-detection signal is generated (step 370). On the other hand, if the second counted value M is between the minimum and maximum vertical values M1 and M2, the method determines that an actual vertical synchronous signal V-SYNC has been detected. Thus, the method determines that a synchronous signal is being input, and a detection signal is generated (step 360).

As shown above, the method determines that a synchronous signal is input only when a proper number of horizontal synchronous signals H-SYNC are detected during the time period T1 and a proper number of vertical synchronous signals V-SYNC are detected during the time period T2. If an incorrect number of horizontal synchronous signals H-SYNC or vertical synchronous signals V-SYNC are detected, the method determines that a synchronous signal is input. Also, the detection of vertical and horizontal synchronous signals V-SYNC and H-SYNC is made while considering the influence of noise on the synchronous signals V-SYNC and H-SYNC. Therefore, the present embodiment can more accurately determine whether or not a synchronous signal is currently being input.

Figure 4:
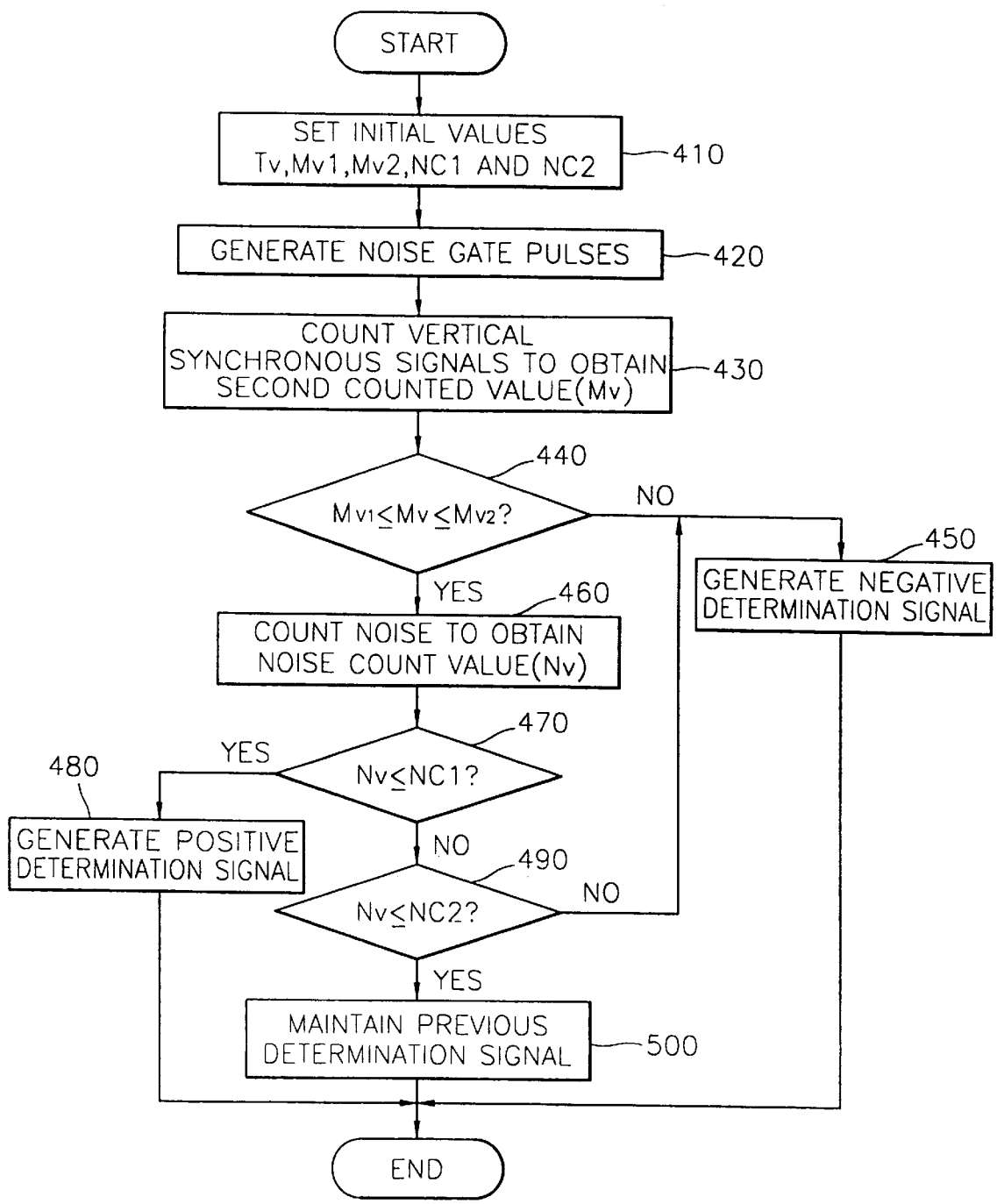
FIG. 4 is a flow chart of a synchronous signal determining method according to another embodiment of the present invention.

FIG. 4 illustrates another embodiment of a method for detecting a synchronous signal. In the method, initial values are set for a period Tv, minimum and maximum values Mv1 and Mv2, and minimum and maximum noise values NC1 and NC2 (step 410). The period Tv coincides with a time during which pulses of vertical synchronous signals V-SYNC are input and is preferably set to a time which is larger than a minimum cycle of the signals V-SYNC. The maximum and minimum values Mv1 and Mv2 respectively relate to the minimum and maximum number of pulses of signals V-SYNC which should occur during the period Tv. Also, the values NC1 and NC2 correspond of the minimum and maximum number of noise pulses which can be recognized as vertical synchronous signals V-SYNC during a period when a noise gate pulse is generated.

In a preferred embodiment, the period Tv should be set to be longer than the time corresponding to the minimum cycle of a vertical synchronous signal V-SYNC for both NTSC and PAL broadcasting systems in order to properly count the number of pulses of the vertical synchronous signals V-SYNC. Also, the values Mv1 and Mv2 should be set by considering the fact that a portion of the vertical synchronous signals V-SYNC may be overlooked due to noise or that noise may be misidentified as the synchronous signals V-SYNC.

After the various values are set in step 410, the noise gate pulses for detecting noise are generated between adjacent pulses of the vertical synchronous signals V-SYNC (step 420). The noise gate pulses are triggered by the vertical synchronous signals V-SYNC as shown in FIG. 7G.

Then, the pulses which are input during the period Tv and which have a particular frequency (or pulse width) value are detected as vertical synchronous signals V-SYNC, and the number of detected vertical synchronous signals V-SYNC are counted to produce a counted value Mv (step 430). Not only are actual vertical synchronous signals V-SYNC counted during the period Tv, but any noise which is misidentified as a vertical synchronous signal V-SYNC is also counted. Also, a pulse of an actual vertical synchronous signal V-SYNC which is affected by noise may not be counted.

Afterwards, the method determines if the counted value Mv is between the minimum and maximum values Mv1 and Mv2 (step 440). If the counted value Mv is not within such range, the method determines that a vertical synchronous signal V-SYNC is not being input. As a result, a negative determination signal indicating that a synchronous signal has not been detected is generated (step 450). On the other hand, when the counted value Mv is larger than the minimum value Mv1 and smaller than the maximum value Mv2, the pulses of noise which have a frequency (or pulse width) that coincides with the vertical synchronous signals V-SYNC and which are input when the noise gate pulses are generated within the period Tv are counted to obtain a noise count value Nv (step 460).

Then, the noise count value Nv is compared with the minimum noise count value NC1 (step 470). When the noise count value Nv is less than the minimum noise count value NC1, the influence of noise upon the synchronous signals can be disregarded when the synchronous signals are detected. As a result, a positive determination signal indicating that a synchronous signal has been detected is generated (step 480).

On the other hand, when the noise count value Nv is larger than the minimum value NC1, the value Nv is compared to the maximum value NC2 (step 490). If the value Nv is larger than the maximum value NC2, the negative determination signal is generated in step 450 because the method determines that a noise signal was detected as a synchronous signal. When the value Nv is smaller than the maximum value NC2, the determination signal which was previously output is maintained (step 500). In other words, if the previous determination signal is the positive determination signal, the noise increases instantaneously. If the previous determination signal is the negative determination signal, the noise decreases instantaneously. Steps 490 and 500 are performed in order to provide a margin of hysteresis to prevent errors in a boundary number for the synchronous signal detection determination. In systems where accuracy can be lowered, the steps 490 and 500 may be omitted.

The above method for detecting a synchronous signal is performed in consideration that noise may be mixed with image signals. Thus, the method of the present invention can more accurately detect a synchronous signal than conventional techniques. Also, even though the method detects the pulses of a vertical synchronous signal V-SYNC, the method may also detect pulses of a horizontal synchronous signal H-SYNC.

Figure 1:
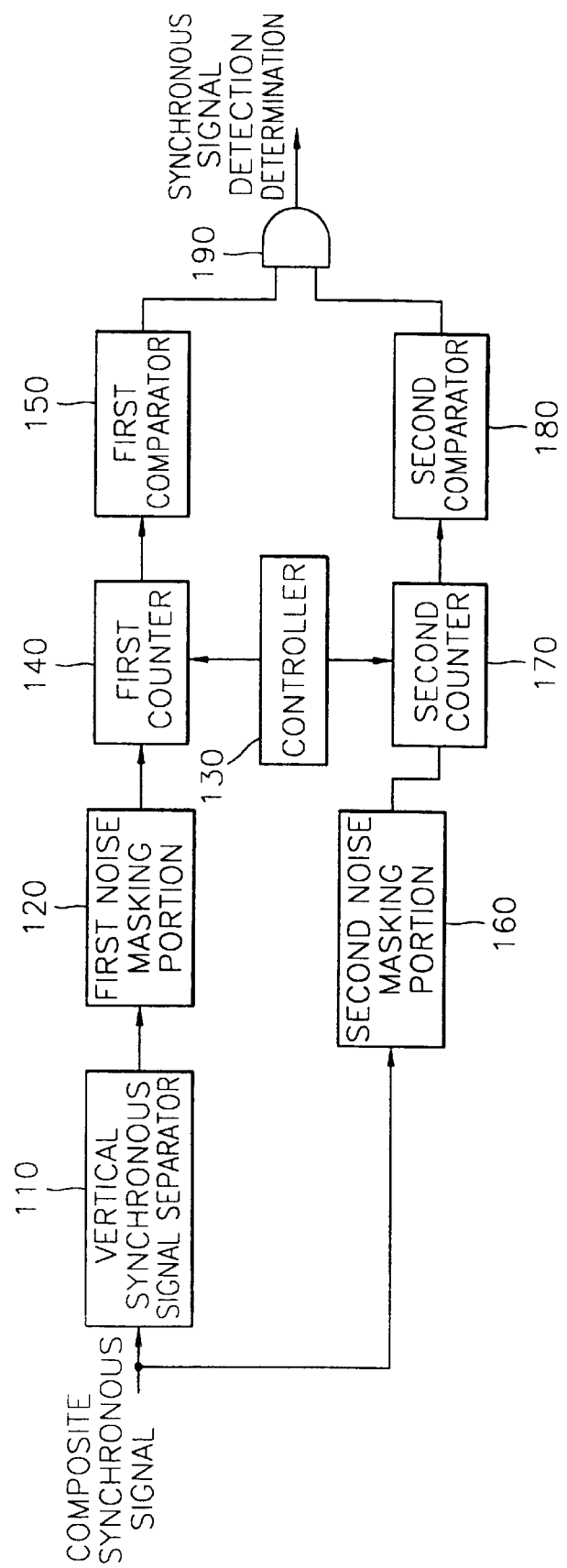
FIG. 1 is a block diagram of a synchronous signal determining device according to an embodiment of the present invention.

FIG. 1 illustrates an apparatus for detecting a synchronous signal in accordance with one embodiment of the present invention. The apparatus comprises a vertical synchronous signal separator 110, a first noise masking portion 120, a controller 130, a first counter 140, a first comparator 150, a second noise masking portion 160, a second counter 170, a second comparator 180, and a logic operation portion 190.

The vertical synchronous signal separator 110 inputs composite synchronous signals, separates only the vertical synchronous signals V-SYNC from the composite synchronous signals, and outputs the vertical synchronous signals V-SYNC. An example of the detailed circuitry of the separator 110 is shown in FIG. 5 and comprises resistors R1, R2, and R3, a capacitor C1, a diode D1, and a transistor Q1. A first terminal of the resistor R1 is connected to a input terminal, and a second terminal of the resistor R1 is connected to a first terminal of the capacitor C1 and to a first terminal of the diode D1. A second terminal of the diode D1 is connected to a first terminal of the resistor R2 and the gate of the transistor Q1. The second terminals of the capacitor C1 and resistor R2 and the emitter of the transistor Q1 are connected to ground. The first terminal of the resistor R3 is connected to Vcc, and the second terminal of the resistor R3 is connected to the collector of the transistor Q1 and the output terminal. Based on the configuration above, when a composite synchronous signal shown in FIG. 6A is input to the input terminal, a vertical synchronous signal V-SYNC having a waveform shown FIG. 6B is output from the output terminal.

The first noise masking portion 120 inputs the vertical synchronous signals V-SYNC and generates a first masking pulse between the adjacent synchronous signals V-SYNC (FIG. 7E). The first masking pulse is used to reduce the influence of noise which is generated when the vertical synchronous signal V-SYNC is detected and is synthesized with the vertical synchronous signal V-SYNC. As a result, noise does not significantly affect the detection operation of the apparatus during the period when the first masking pulse is generated. In the preferred embodiment, the first masking pulse is obtained by subtracting a margin value n1 from the cycle $T_{VS}$ of the vertical synchronous signal V-SYNC while various errors are taken into account.

The controller 130 generates first and second control signals for determining the periods during which the number of pulses of the vertical and horizontal synchronous signals V-SYNC and H-SYNC are calculated. Such periods respectively correspond to the periods T1 and T2 described above in conjunction with FIG. 3. The first counter 140 inputs the first control signal and counts the number of pulses which correspond to the vertical synchronous signals V-SYNC from among the image signals input during the period T1. Then, the first comparator 150 determines whether a first counted value N is greater than the minimum value N1 and less than the maximum value N2. If the value N falls within such range, the apparatus generates a first detection signal. Initially, the range is determined by properly selecting experimental values for the values N1 and N2 in consideration of the fact that the influence of noise is reduced by the first masking pulse.

The second noise masking portion 160 inputs the composite synchronous signal and generates a second masking pulse between adjacent horizontal synchronous signals H-SYNC (FIG. 7F). The second masking pulse is used to reduce the influence of noise which is generated when the horizontal synchronous signals H-SYNC are detected and is synthesized with the composite synchronous signal. As a result, noise does not significantly affect the detection operation of the apparatus during the period when the second masking pulse is generated. In the preferred embodiment, the second masking pulse is obtained by subtracting a margin value n2 from the cycle $T_{HS}$ of the horizontal synchronous signal H-SYNC while various errors are taken into account.

The second counter 170 inputs the second control signal from the controller 130 and counts the number of pulses which correspond to the horizontal synchronous signals H-SYNC from among the image signals input during the period T2. Then, the second comparator 180 determines whether a second counted value M is greater the minimum value M1 and less than the maximum value M1. If the value M falls within such range, the apparatus generates a second detection signal. Initially, the range is determined by properly selecting experimental values for values M1 and M2 in consideration of the fact that the influence of noise is reduced by the second masking pulse.

The logic operation portion 190 inputs the first and second detection signals and outputs a determination signal. The determination signal indicates a synchronous signal has been detected only when both the first and second detection signals are generated. In the present embodiment, the first and second detection signals are both active high signals, and the logic operation portion 190 comprises an AND gate.

When a synchronous signal is detected by the apparatus described above, the influence of noise is reduced due to the use of the masking pulses generated by the first and second noise masking portions 120 and 160. Also, the apparatus determines that a synchronous signal is input only when the first and second comparators 150 and 180 detect the vertical and horizontal synchronous signals V-SYNC and H-SYNC. As a result, the apparatus detects the synchronous signal with a high accuracy despite the presence of noise.

Figure 2:
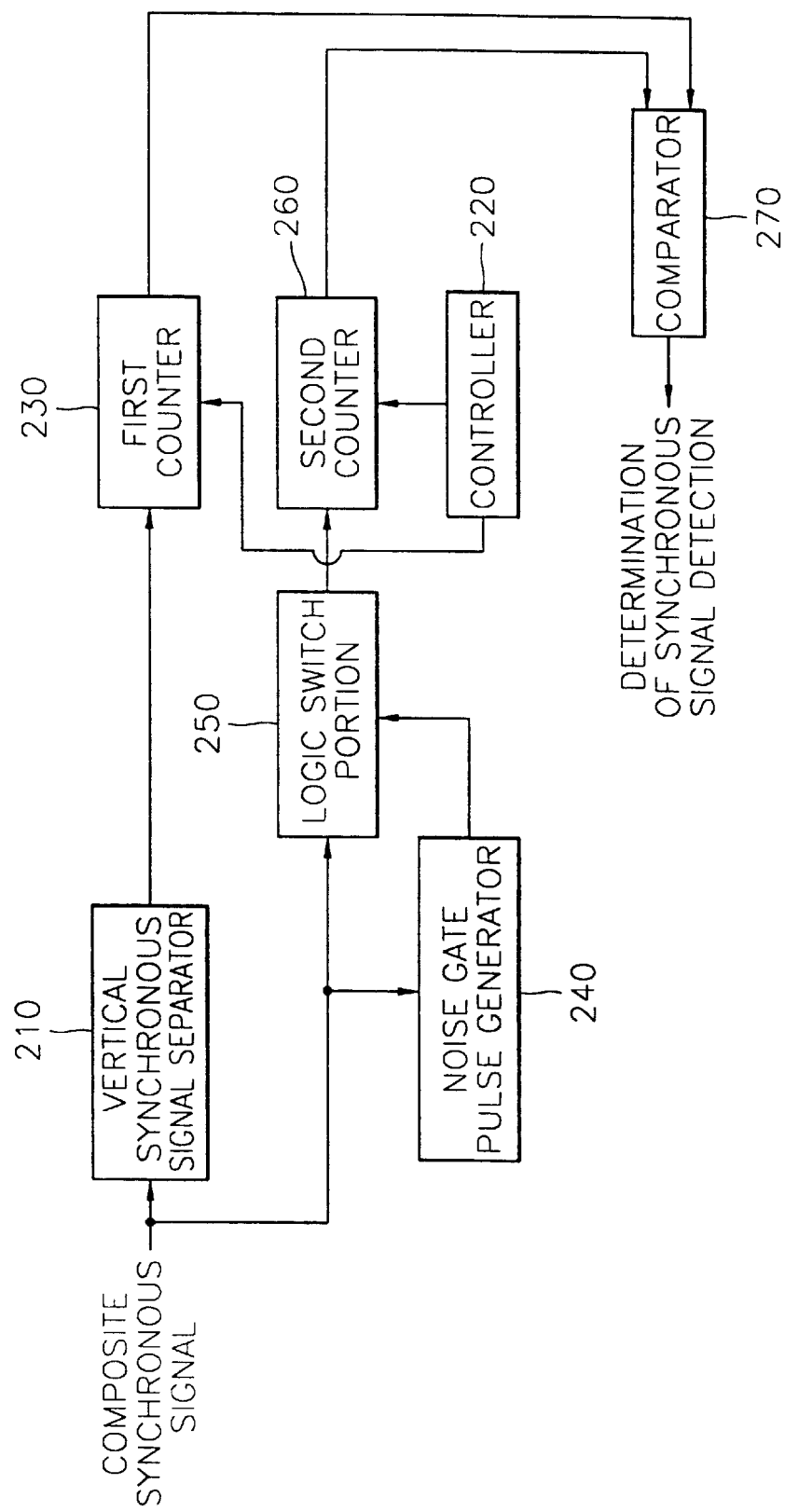
FIG. 2 is a block diagram of a synchronous signal determining device according to another embodiment of the present invention.

FIG. 2 illustrates an apparatus for detecting a synchronous signal in accordance with another embodiment of the present invention. The apparatus comprises a vertical synchronous signal separator 210, a controller 220, a first counter 230, a noise gate pulse generator 240, a logic switch portion 250, a second counter 260, and a comparator 270.

The vertical synchronous signal separator 210 inputs composite synchronous signals, separates only the vertical synchronous signals V-SYNC from the composite synchronous signals, and outputs the vertical synchronous signals V-SYNC. The separator 210 may be similar to the separator 110 described above in conjunction with FIG. 1.

The controller 220 generates a control signal for determining the period during which the number of vertical synchronous signals V-SYNC are calculated. Such period corresponds to the period Tv described above in conjunction with FIG. 4. The first counter 230 inputs the control signal and counts the number of pulses which correspond to the vertical synchronous signals V-SYNC from among the image signals input during the period Tv to produce the counted value Mv.

The noise gate pulse generator 240 inputs the composite synchronous signals, generates a noise gate pulse between adjacent vertical synchronous signals V-SYNC, and outputs the noise gate pulses. The logic switch portion 250 inputs the composite synchronous signals and the noise gate pulses and outputs the composite synchronous signals only when the noise gate pulse is generated. Accordingly, the switch portion 250 outputs noise in the composite synchronous signals except for noise which occurs during the vertical synchronous signals V-SYNC. In a preferred embodiment, the logic switch portion 250 may comprise an AND gate which inputs the composite synchronous signals and the noise gate pulses, performs an AND operation on such signals, and outputs the ANDed signal. Then, the second counter 260 inputs the signals output from the logic switch portion 250 and generates a noise count value Nv by counting only the noise pulses which have a frequency (or pulse width) corresponding to the frequency (or pulse width) of a vertical synchronous signal V-SYNC and which are output during the period in which the noise gate pulse is generated.

The comparator 270 inputs the counted value Mv from the first counter 230 and inputs noise count value Nv from the second counter 260. Then, the comparator 270 subtracts the noise count value Nv from the counted value Mv to obtain a difference value and determines if the difference value is within a predetermined range. The predetermined range should be set in consideration of the influence of noise which may be generated in the system. As noted above, the noise count value Nv is obtained by counting the noise gate pulses, and the counted value Mv is obtained by counting the vertical synchronous signals V-SYNC without considering noises. Thus, by calculating the difference value, the number of actual vertical synchronous signals V-SYNC can be detected.

If the subtraction value is within the predetermined range, the apparatus determines that an actual synchronous signal has been detected and generates a synchronous signal detection determination signal. On the other hand, if the difference value is not within the predetermined range, the apparatus determines that an actual synchronous signal has not been detected and that a false synchronous signal has been detected due to noise. Thus, the apparatus generates a synchronous signal non-detection determination signal.

As described above, the present invention determines if the synchronous signal is detected by considering the influence of noise. Therefore, the invention is able to more accurately detect synchronous signals.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A method for determining if a synchronous signal is contained in an input image signal, comprising the steps of:

(a) establishing a horizontal period during which horizontal synchronous signal pulses contained in said input image signal are counted;

(b) establishing a vertical period during which vertical synchronous signal pulses contained in said input image signal are counted;

(c) establishing a minimum horizontal value and a maximum horizontal value which correspond to a proper number of said horizontal synchronous signal pulses contained in said horizontal period;

(d) establishing a minimum vertical value and a maximum vertical value which correspond to a proper number of said vertical synchronous signal pulses contained in said vertical period;

(e) counting a first number of said horizontal synchronous signal pulses during said horizontal period to obtain a first counted value;

(f) counting a second number of said vertical synchronous signal pulses during said vertical period to obtain a second counted value; and (g) determining if said first counted value is greater than or equal to said minimum horizontal value and less than or equal to said maximum horizontal value;

(h) determining if said second counted value is greater than or equal to said minimum vertical value and less than or equal to said maximum vertical value; and (i) determining than an actual synchronous signal is contained in said input image signal if said first counted value is greater than or equal to said minimum horizontal value and less than or equal to said maximum horizontal value and said second counted value is greater than or equal to said minimum vertical value and less than or equal to said maximum vertical value.

* * * * *

UNITED STATES PATENT AND TRADEMARK OFFICE
CERTIFICATE OF CORRECTION

PATENT NO.       : 6,275,264 B1                                                    Page 1 of 1
APPLICATION NO. : 09/004321
DATED            : August 14, 2001
INVENTOR(S)      : Paul J. Voit It is certified that error appears in the above-identified patent and that said Letters Patent is hereby corrected as shown below:

In column 7, line 26, "claim 3" should be --claim 1--.

Signed and Sealed this

Seventh Day of November, 2006

JON W. DUDAS
*Director of the United States Patent and Trademark Office*

UNITED STATES PATENT AND TRADEMARK OFFICE
CERTIFICATE OF CORRECTION

PATENT NO.         : 6,275,264 B1                                        Page 1 of 1
APPLICATION NO. : 09/004321
DATED               : August 14, 2001
INVENTOR(S)       : Chiu-Min Kim It is certified that error appears in the above-identified patent and that said Letters Patent is hereby corrected as shown below:

This certificate supersedes Certificate of Correction issued November 7, 2006, should be vacated since no Certificate of Correction was granted for this patent number.

Signed and Sealed this

Nineteenth Day of December, 2006

JON W. DUDAS
*Director of the United States Patent and Trademark Office*